US012380861B2

(12) United States Patent
Maruyama

(10) Patent No.: US 12,380,861 B2
(45) Date of Patent: Aug. 5, 2025

(54) SOURCE AMPLIFIER CONTROL FOR POWER CONSUMPTION REDUCTION IN DISPLAY DRIVERS

(71) Applicant: Synaptics Incorporated, San Jose, CA (US)

(72) Inventor: Atsushi Maruyama, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/493,091

(22) Filed: Oct. 24, 2023

(65) Prior Publication Data

US 2025/0131888 A1 Apr. 24, 2025

(51) Int. Cl.
*G09G 3/3291* (2016.01)

(52) U.S. Cl.
CPC ... *G09G 3/3291* (2013.01); *G09G 2300/0819* (2013.01); *G09G 2310/027* (2013.01); *G09G 2310/0291* (2013.01); *G09G 2320/0276* (2013.01); *G09G 2330/021* (2013.01); *G09G 2330/028* (2013.01)

(58) Field of Classification Search
CPC ........... G09G 3/3291; G09G 2310/027; G09G 2310/0291; G09G 2320/0276; G09G 2330/021; G09G 2320/045; G09G 2300/0819; G09G 2330/028
See application file for complete search history.

(56) References Cited

U.S. PATENT DOCUMENTS 11,151,941 B1 10/2021 Shikata et al.
2012/0032935 A1* 2/2012 Yen .......................... G09G 3/20 345/204
2016/0098959 A1 4/2016 Moon et al.
2016/0098966 A1* 4/2016 Kim ..................... G09G 3/3614 345/690
2017/0285973 A1 10/2017 Dalmatov
2022/0415230 A1 12/2022 Kwon et al.

FOREIGN PATENT DOCUMENTS

KR 1020200078950 A 7/2020

OTHER PUBLICATIONS

International Search Report, dated Feb. 5, 2025, in International Patent Application No. PCT/US2024/053257 filed Oct. 22, 2024.

* cited by examiner

*Primary Examiner* — Douglas Wilson

(74) *Attorney, Agent, or Firm* — Leydig, Voit & Mayer, Ltd.

(57) ABSTRACT

A display driver includes first and second source outputs coupled to a display panel, a second source output, a first source amplifier, a second source amplifier, and a first switch. The first source amplifier is configured to provide a first data voltage to the first source output based on first pixel data during a display update period and provide a predetermined voltage to the first source output during a non-display update period. The second source amplifier is configured to provide a second data voltage to the second source output based on second pixel data during the display update period. The first switch is configured to electrically connect an output of the first source amplifier to the second source output to provide the predetermined voltage to the second source output during the non-display update period. The second source amplifier is configured to be deactivated during the non-display update period.

20 Claims, 9 Drawing Sheets

SOURCE AMPLIFIER CONTROL FOR POWER CONSUMPTION REDUCTION IN DISPLAY DRIVERS

TECHNICAL FIELD

This disclosure relates generally to display drivers, and more particularly to source amplifier control for reducing power consumption in display drivers.

BACKGROUND

A display driver of a panel display device, such as an organic light emitting diode (OLED) display device, a micro light emitting diode (LED) display device, and a liquid crystal display (LCD) device, may use source amplifiers to drive source lines (also referred to as data lines) of the display panel. In a typical implementation, the source amplifiers may be configured to generate data voltages corresponding to pixel data and provide the data voltages to pixels of the display panel to drive or update the pixels with the data voltages.

In some implementations, the source amplifiers may further be used to drive the source lines at a desired voltage level during blanking periods. For example, in implementations where pixels of a display panel may suffer from charge leakage from storage capacitors thereof during blanking periods, the source amplifiers may drive the source lines at a predetermined voltage during the blanking periods to suppress or eliminate charge leakage from the storage capacitors.

SUMMARY

This summary is provided to introduce a selection of concepts in a simplified form that are further described below. This summary is not necessarily intended to identify key features or essential features of the present disclosure. The present disclosure may include the following various aspects and embodiments.

In an exemplary embodiment, the present disclosure provides a display driver. The display driver includes a first source output, a second source output, a first source amplifier, a second source amplifier, and a first switch. The first and second source outputs are coupled to a display panel. The first source amplifier is configured to provide a first data voltage to the first source output based on first pixel data during a display update period and provide a predetermined voltage to the first source output during a non-display update period. The second source amplifier is configured to provide a second data voltage to the second source output based on second pixel data during the display update period. The first switch is configured to electrically connect an output of the first source amplifier to the second source output to provide the predetermined voltage to the second source output during the non-display update period. The second source amplifier is configured to be deactivated during the non-display update period.

In another exemplary embodiment, the present disclosure provides a display device. The display device includes a display panel and a display driver. The display driver includes a first source output, a second source output, a first source amplifier, a second source amplifier, and a first switch. The first and second source outputs are coupled to the display panel. The first source amplifier is configured to provide a first data voltage to the first source output based on first pixel data during a display update period and provide a predetermined voltage to the first source output during a non-display update period. The second source amplifier is configured to provide a second data voltage to the second source output based on second pixel data during the display update period. The first switch is configured to electrically connect an output of the first source amplifier to the second source output to provide the predetermined voltage to the second source output during the non-display update period. The second source amplifier is configured to be deactivated during the non-display update period.

In yet another exemplary embodiment, the present disclosure provides a method. The method includes providing, by a first source amplifier, a first data voltage to a first source output based on first pixel data during a display update period, wherein the first source output is coupled to a display panel. The method further includes providing, by a second source amplifier, a second data voltage to a second source output based on second pixel data during the display update period, wherein the second source output is coupled to the display panel. The method further includes providing, by the first source amplifier, a predetermined voltage to the first source output during a non-display update period. The method further includes electrically connecting the output of the first source amplifier to the second source output to provide the predetermined voltage to the second source output during the non-display update period. The method further includes deactivating the second source amplifier during the non-display update period.

Other features and aspects are described in more detail below with reference to the accompanying drawings.

Figure 1:
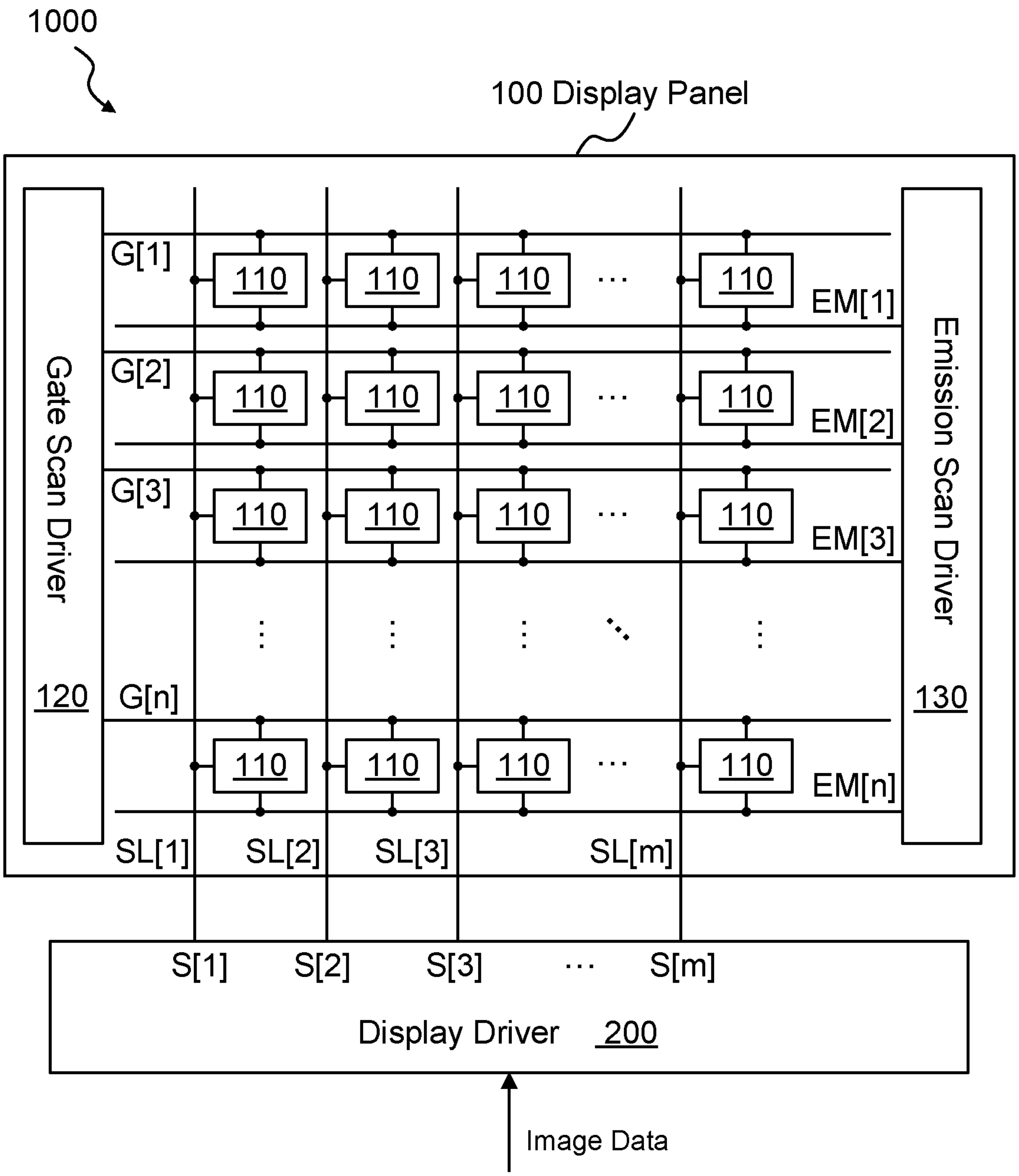
FIG. 1 shows an example configuration of a display device, according to one or more embodiments.

To facilitate understanding, identical reference numerals have been used, where possible, to designate elements that are common to the figures. It is contemplated that elements disclosed in one embodiment may be utilized in other embodiments without specific recitation. Suffixes may be added to reference numerals for distinguishing elements from one another. The drawings referred to herein should not be understood as being drawn to scale unless specifically noted. Also, the drawings are often simplified and details or components are omitted for clarity of presentation and explanation. The drawings and discussion serve to explain principles discussed below.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As discussed above, a display driver of a panel display device, such as an OLED display device, a micro-LED display device, and an LCD device, may use source amplifiers to drive source lines of the display panel. In a typical implementation, the source amplifiers may be configured to generate data voltages corresponding to pixel data and provide the data voltages to pixels of the display panel to drive or update the pixels with the data voltages. In some implementations, the source amplifiers may further be used to drive the source lines at a desired voltage level during blanking periods. More specifically, in implementations where pixels of the display panel may suffer from charge leakage from storage capacitors thereof during blanking periods, the source amplifiers may drive the source lines at a predetermined voltage during blanking periods to suppress or eliminate charge leakage from the storage capacitors.

With recent increases in the display resolution, a display driver may incorporate an increased number of source amplifiers. Since source amplifiers may consume significant power, the uses of an increased number of source amplifiers may undesirably increase the power consumption of the display device. Accordingly, there is a technical need to reduce the power consumption of the source amplifiers. Presented below are embodiments of the present disclosure which suppress or eliminate charge leakage from storage capacitors in pixels while reducing power consumption of the source amplifiers.

FIG. 1 shows an example configuration of a display device 1000, according to one or more embodiments. In the illustrated embodiment, the display device 1000 includes a display panel 100 and a display driver 200. In the shown embodiment, the display panel 100 is an OLED display panel. In other embodiments, the display panel 100 may be a different type of display panel, such as a micro-LED display panel and an LCD panel. The display driver 200 is configured to receive image data from an external image source (e.g., an application processor, a central processing unit (CPU), or a different type of processor) and display a desired image on the display panel 100 based on the received image data.

In the shown embodiment, the display panel 100 includes an array of pixels 110, a gate scan driver 120, an emission scan driver 130, a set of gate lines G [1] to G [n], a set of emission lines EM [1] to EM [n], and a set of source lines SL [1] to SL [m]. Each pixel 110 is coupled to a corresponding gate line G [i], a corresponding emission line EM [i], and a corresponding source lines SL [j], where i is a natural number between 1 and n, inclusive, and j is a natural number between 1 and m, inclusive. The gate lines G [1] to G [n] are coupled to the gate scan driver 120, and the emission lines EM [1] to EM [n] are coupled to the emission scan driver 130. The source lines SL [1] to SL [m] are coupled to source outputs S [1] to S [m] of the display driver 200.

The pixels 110 are each configured to be driven or updated with a data voltage received from the display driver 200. In one or more embodiments, driving or updating a pixel 110 coupled to the gate line G [i], the emission line EM [i], and the source line SL [j] may be accomplished by asserting the gate line G [i] in a state in which the emission line EM [i] is deasserted and a data voltage is supplied to the source line SL [j]. The pixels 110 are each further configured to emit light with a luminance level corresponding to the data voltage received from the display driver 200. The light emission from the pixels 140 is controlled by the emission lines EM [1] to EM [N]. The pixels 110 coupled to the emission line EM [i] are configured to emit light when the emission line EM [i] is asserted and not to emit light when the emission line EM [i] is deasserted. The gate scan driver 120 is configured to scan (e.g., sequentially assert) the gate lines G [1] to G [N] to select pixels 110 to be driven or updated. In one implementation, the gate scan driver 120 is configured to assert the gate line G [i] when pixels 110 coupled to the gate line G [i] are driven or updated. The emission scan driver 130 is configured to scan the emission lines EM [1] to EM [N] to control light emission from the pixels 110 coupled to the emission lines EM [1] to EM [N].

Figure 2:
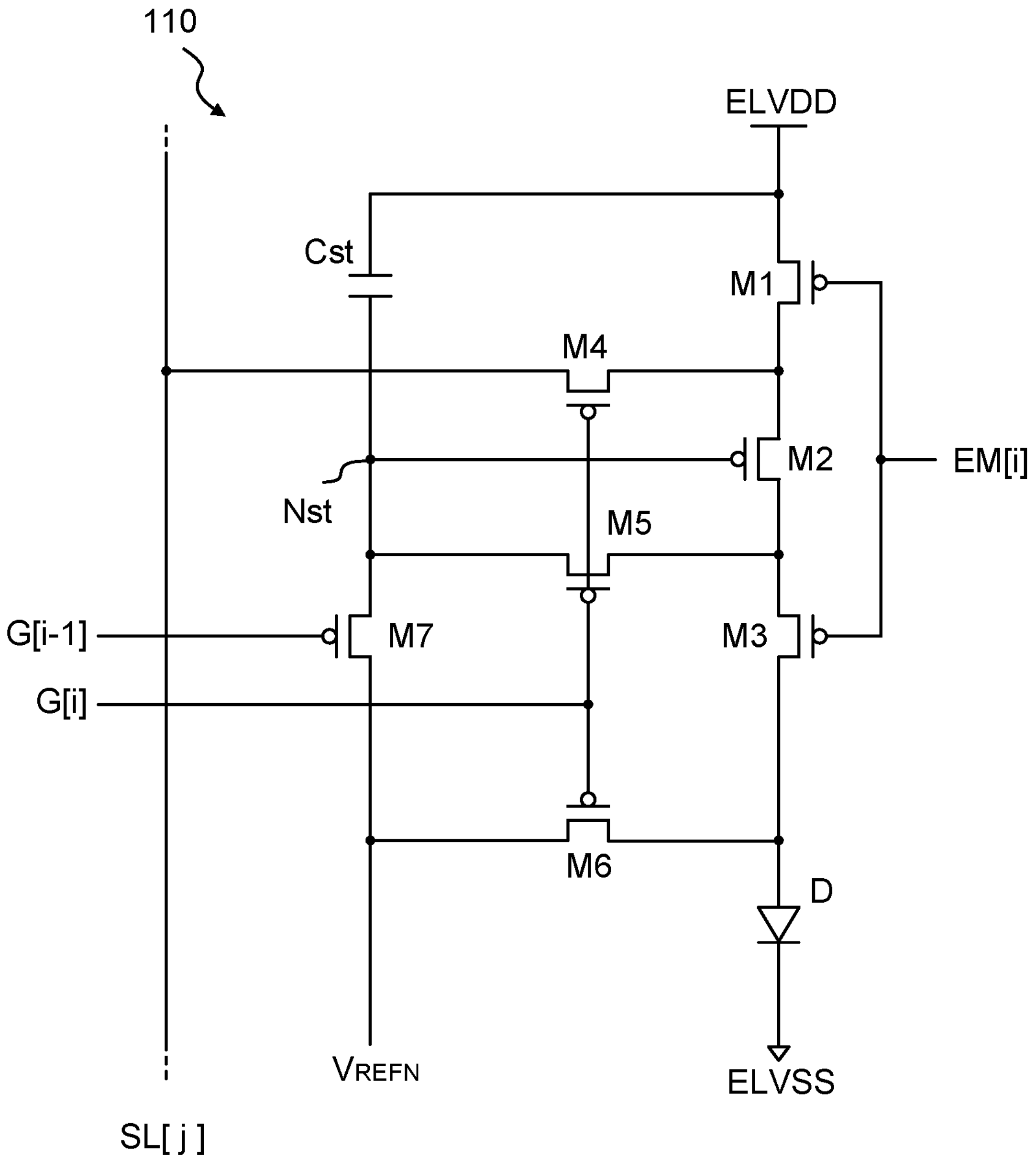
FIG. 2 shows an example configuration of a pixel, according to one or more embodiments.

FIG. 2 shows an example configuration of the pixel 110 coupled to the gate line G [i], the emission line EM [i], and the source line SL [j], according to one or more embodiments. In the shown embodiment, the pixel 110 is configured as an OLED pixel that includes p-channel metal oxide semiconductor (PMOS) transistors M1, M2, M3, M4, M5, M6, and M7, an OLED element D, and a storage capacitor Cst. The storage capacitor Cst is coupled between a high-side power supply ELVDD and a storage node Nst and configured to hold a voltage corresponding to the data voltage supplied to the pixel 110. The PMOS transistors M1, M2, M3, M4, M5, M6, and M7 are collectively configured to provide a drive current depending on the voltage across the storage capacitor Cst. The OLED element D is driven with the drive current to emit light at a luminance level corresponding to the data voltage.

More specifically, the PMOS transistors M1, M2, M3, and the OLED element D are coupled in series between a high-side power supply ELVDD and a low-side power supply ELVSS. The PMOS transistors M1, M2 and M3 form a path that provides a drive current depending on the voltage across the storage capacitor Cst. The gates of the PMOS transistors M1 and M3 are coupled to the emission line EM

[i] and the gate of the PMOS transistor M2 is coupled to a storage node Nst. The OLED element D has an anode coupled to the drain of the PMOS transistor M3 and a cathode coupled to the low-side power supply ELVSS. The PMOS transistors M4, M5, and M6 each have a gate coupled to the gate line G [i]. The PMOS transistor M4 is coupled between the source line SL [i] and the source of the PMOS transistor M2. The PMOS transistor M5 is coupled between the storage node Nst and the drain of the PMOS transistor M2. The PMOS transistor M6 is coupled between the anode of the OLED element D and a node at which an initialization voltage VREEN is generated. The PMOS transistor M7 has a gate coupled to the gate line G [i−1], which is a gate line asserted during a horizontal period immediately preceding the horizontal period during which the gate line G [i] is asserted. It is noted that for i=1, the gate line G [0] may be a dummy gate line that is asserted during a horizontal period immediately preceding the horizontal period during which the gate line G [1] is asserted. The PMOS transistor M7 is coupled between the storage node Nst and the node at which the initialization voltage VREEN is generated.

In one implementation, a write operation is performed to update the pixel 110 with a drive voltage during a display update period. The write operation involves operating the gate lines G [i−1] and G [i] in a predetermined sequence in the state where the emission line EM [i] is deasserted and the drive voltage is applied to the source line SL [j]. This allows the drive voltage to be written into the storage capacitor Cst. As the emission line EM[i] is deasserted, the PMOS transistors M1 and M3 are opened (or turned off) and the OLED element D does not emit light during the write operation. When the emission line EM[i] is asserted after the write operation is completed, the PMOS transistors M1 and M3 are closed (or turned on) to provide the OLED element D with a drive current corresponding to the voltage across the storage capacitor Cst. The drive current allows the OLED element D to emit light at the luminance level corresponding to the data voltage.

The pixel 110 shown in FIG. 2 may suffer from charge leakage from the storage capacitor Cst during a non-display update period. The non-display update period may include a blanking period, such as a back porch period and a front porch period. The charge leakage may change the voltage across the storage capacitor Cst, causing undesirable changes in the luminance level of the pixel 110.

One approach to suppress or eliminate the charge leakage from the storage capacitor Cst of the pixel 110 is to drive the source line SL [j] to a "leakage suppression voltage" during the non-display update period. The leakage suppression voltage is a predetermined voltage in the allowed voltage range for the source line SL [j]. The voltage level of the "leakage suppression voltage" is adjusted to substantially maintain the voltage held across the storage capacitor Cst. In one implementation, the leakage suppression voltage may be set to a voltage level higher than the ELVDD level, where the ELVDD level is the voltage level of the high-side power supply voltage provided from the high-side power supply ELVDD to the respective pixels 110 of the display panel 100.

The present disclosure recognizes that since it would be advantageous for the leakage suppression voltage to be finely adjustable, one efficient way to drive the source lines SL [1] to SL [m] to the leakage suppression voltage is to use source amplifiers integrated in the display driver 200. However, using all of the source amplifiers to drive the source lines SL [1] to SL [m] to the leakage suppression voltage may consume considerable power. To reduce power consumption, embodiments of the present disclosure use some but not all of the source amplifiers integrated in the display driver 200 to provide the leakage suppression voltage to the source lines SL [1] to SL [m]. Presented below are embodiments of the present disclosure which suppress or eliminate charge leakage from storage capacitors in pixels with efficient source amplifier control to suppress power consumption. It should be noted that since the problem of charge leakage from storage capacitors of pixels may also be present in other pixel configurations, those skilled in the art would appreciate that the techniques disclosed in the present disclosure may be applied to display devices having different pixel configurations.

Figure 3:
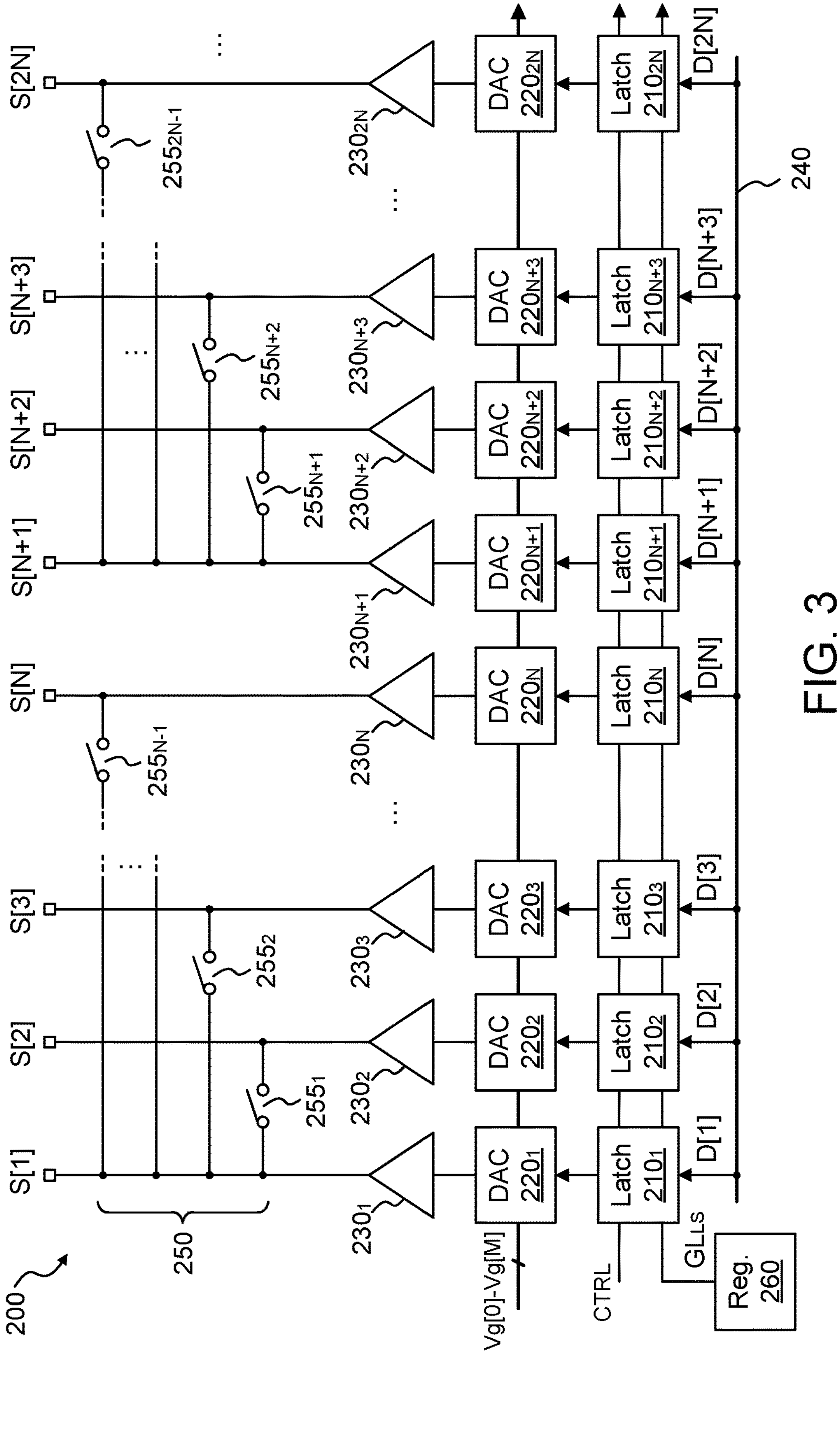
FIG. 3 shows an example partial configuration of a display driver, according to one or more embodiments.

FIG. 3 shows an example partial configuration of the display driver 200, according to one or more embodiments. While FIG. 3 shows a part of the display driver 200 relevant to the source outputs S [1] to S [2N], those skilled in the art would appreciate that the rest of the display driver 200 may be similarly configured. In the shown embodiments, the display driver 200 is configured to provide data voltages to the source outputs S [1] to S [2N] based on pixel data D [1] to D [2N], where the pixel data D [1] to D [2N] specify greylevels of pixels coupled to the source outputs S [1] to S [2N], respectively. The data voltages output from the source outputs S [1] to S [2N] have voltage levels corresponding to the greylevels of the pixel data D [1] to D [2N], respectively. In the shown embodiment, the display driver 200 includes a set of latches $\mathbf{210}_1$ to $\mathbf{210}_{2N}$, a set of digital-to-analog converters (DACs) $\mathbf{220}_1$ to $\mathbf{220}_{2N}$, a set of source amplifiers $\mathbf{230}_1$ to $\mathbf{230}_{2N}$, a data bus 240, a switch circuitry 250, and a register 260.

For any integer i between one and 2N, inclusive, the latch $\mathbf{210}_i$, the DAC $\mathbf{220}_i$, and the source amplifier $\mathbf{230}_i$ are collectively configured to generate and provide the data voltage to the source output S [i] based on the pixel data D [i]. More specifically, the latch $\mathbf{210}_i$ is configured to latch the pixel data D [i] from the data bus 240 and forward the pixel data D [i] to the DAC $\mathbf{220}_i$. The DAC $\mathbf{220}_i$ is configured to receive a set of gamma voltages Vg [0] to Vg [M] and perform digital-to-analog conversion on the pixel data D [i] using the gamma voltages Vg [0] to Vg [M] to output a gamma voltage corresponding to the greylevel specified by the pixel data D [i]. In one implementation, the DAC $\mathbf{220}_i$ may be configured to select one of the gamma voltages Vg [0] to Vg [M] based on the greylevel specified by the pixel data D [i] and output the selected gamma voltage. The source amplifier $\mathbf{230}_i$ is configured to generate the data voltage corresponding to the pixel data D[i] based on the gamma voltage received from the DAC $\mathbf{220}_i$. In one implementation, the source amplifier $\mathbf{230}_i$ may be configured to perform an impedance conversion on the received gamma voltage to generate the data voltage.

The switch circuitry 250 includes a first set of switches $\mathbf{255}_1$ to $\mathbf{255}_{N-1}$ and a second set of switches $\mathbf{255}_{N+1}$ to $\mathbf{255}_{2N-1}$. The switches $\mathbf{255}_1$ to $\mathbf{255}_{N-1}$ and $\mathbf{255}_{N+1}$ to $\mathbf{255}_{2N-1}$ may be collectively referred to as the switches 255 when the switches $\mathbf{255}_1$ to $\mathbf{255}_{N-1}$ and $\mathbf{255}_{N+1}$ to $\mathbf{255}_{2N-1}$ are not distinguished from one another. The switches $\mathbf{255}_1$ to $\mathbf{255}_{N-1}$ are coupled between the output of the source amplifier $\mathbf{230}_1$ and the source outputs S [2] to S [N], respectively, while the switches $\mathbf{255}_{N+1}$ to $\mathbf{255}_{2N-1}$ are coupled between the output of the source amplifier $\mathbf{230}_{N+1}$ and the source outputs S [N+2] to S [2N], respectively. While only six switches 255 are shown in FIG. 3, those skilled in the art would appreciate that there are N−1 switches 255 between the output of the source amplifier $\mathbf{230}_1$ and the source outputs S [2] to S[N], and there are N−1 switches 255 between the output of the source amplifier $230_{N+1}$ and the source outputs S[N+2] to S[2N]. As discussed in detail later, the switches $255_1$ to $255_{N-1}$ are used to electrically connect the output of the source amplifier $230_1$ to the source outputs S [2] to S [N] during the non-display update period, and the switches $255_{N+1}$ to $255_{2N-1}$ are used to electrically connect the output of the source amplifier $230_{N+1}$ to the source outputs S [N+2] to S [2N] during the non-display update period.

The register 260 is coupled to the latches $210_1$ to $210_{2N}$ and configured to store and provide a "leakage suppression greylevel" $GL_{LS}$ to the latches $210_1$ to $210_{2N}$. The leakage suppression greylevel $GL_{LS}$ corresponds to the "leakage suppression voltage", which means that each source amplifier 230 is configured to output the "leakage suppression voltage" when the leakage suppression greylevel $GL_{LS}$ is provided to the corresponding DAC 220. The latches $210_1$ to $210_{2N}$ are configured to latch and provide the leakage suppression greylevel $GL_{LS}$ to the DACs $220_1$ to $220_{2N}$ in response to an assertion of a latch control signal CTRL.

Figure 4:
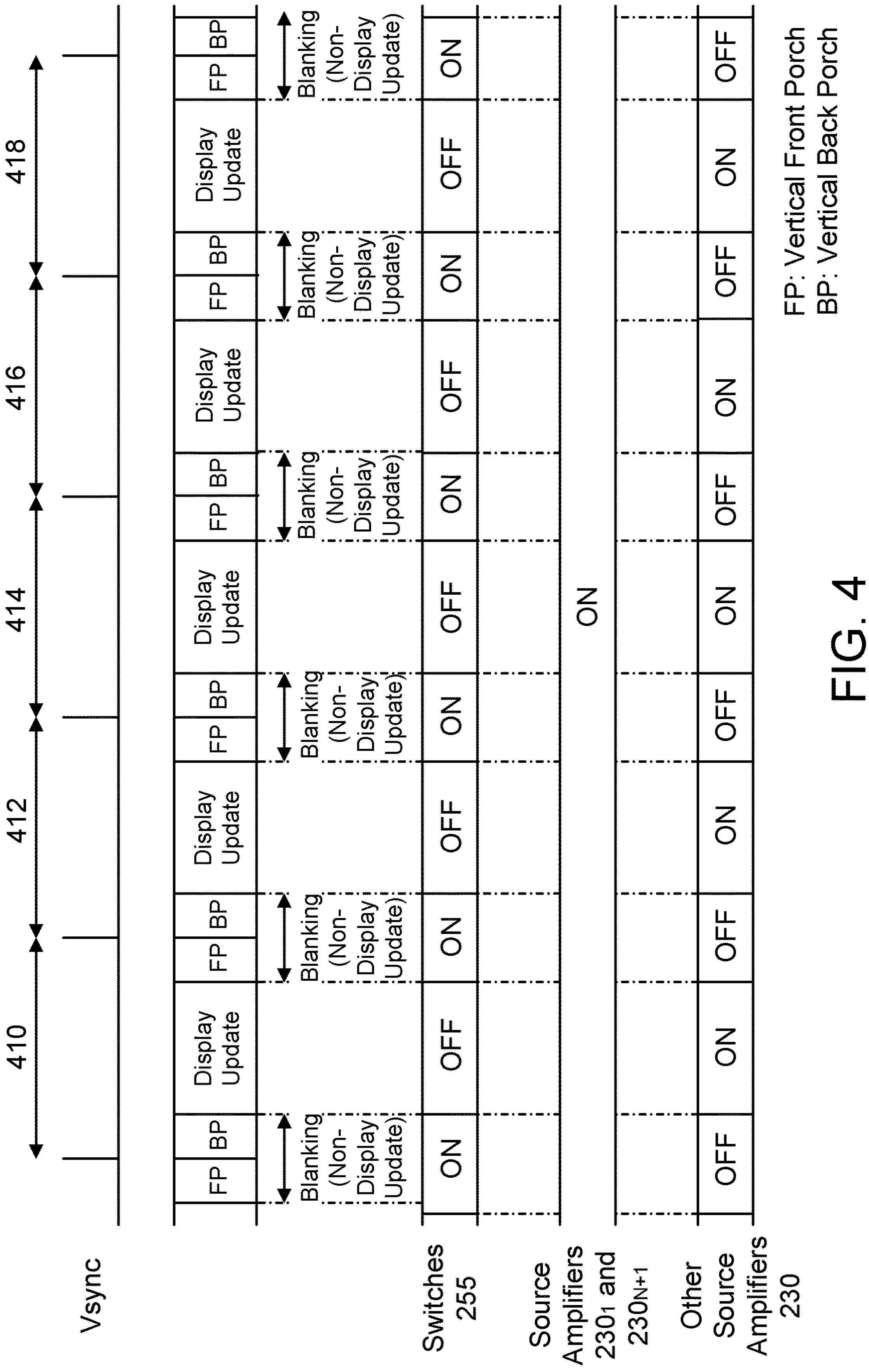
FIG. 4 is a timing chart showing an example operation of a display driver, according to one or more embodiments.

FIG. 4 is a timing chart showing an example operation of the part of the display driver 200 shown in FIG. 3 during vertical sync periods 410, 412, 414, 416, and 418, according to one or more embodiments. It is noted that the beginning and end of each vertical sync period are defined by a vertical sync signal Vsync generated in the display driver 200. Each of the vertical sync periods 410, 412, 414, 416, and 418 includes a vertical back porch (BP) period, a display update period, and a vertical front porch (FP) period. The vertical back porch period is a blanking or non-display update period provided at the beginning of each vertical sync period and the vertical front porch period is a blanking or non-display update period provided at the end of each vertical sync period.

During the display update period of each vertical sync period, all the switches 255 are opened (which is indicated by "OFF" in FIG. 4). As a result, the output of the source amplifier $230_1$ is electrically disconnected from the source outputs S [2] to S [N], and the output of the source amplifier $230_{N+1}$ is electrically disconnected from the S [N+2] to S [2N]. In addition, all of the source amplifiers $230_1$ to $230_{2N}$ are activated (which is indicated by "ON" in FIG. 4) to provide the data voltages to the source outputs S [1] to S [2N] based on the pixel data D [1] to D [2N], respectively.

Figure 5A:
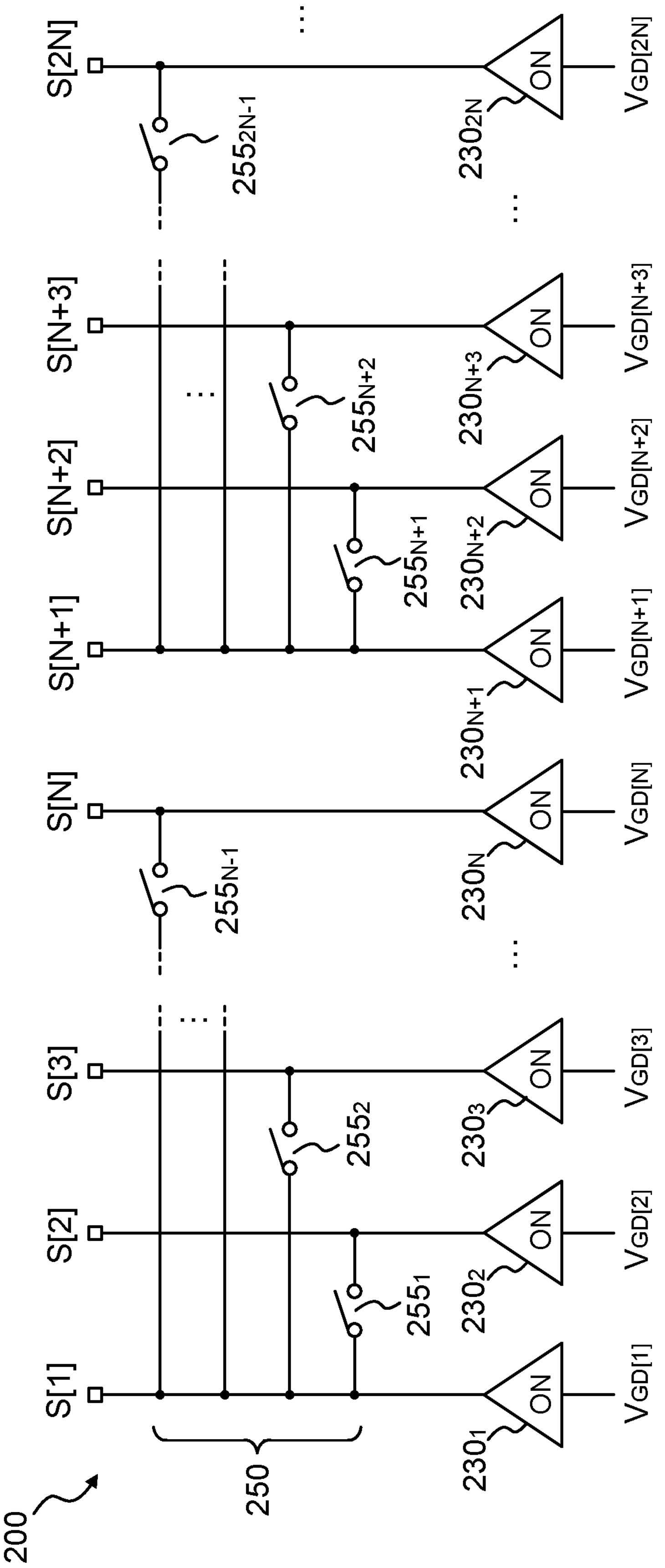
FIG. 5A shows an example operation of source amplifiers during a display update period, according to one or more embodiments.

FIG. 5A shows an example operation of the source amplifiers $230_1$ to $230_{2N}$ during the display update period of each vertical sync period, according to one or more embodiments. The source amplifiers $230_1$ to $230_{2N}$ receive gamma voltages $V_{GD[1]}$ to $V_{GD[2N]}$ from the DACs $220_1$ to $220_{2N}$, where the gamma voltages $V_{GD[1]}$ to $V_{GD[2N]}$ correspond to the pixel data D [1] to D [2N], respectively. The source amplifiers $230_1$ to $230_{2N}$ generate and provide the data voltages corresponding to the pixel data D [1] to D [2N] to the source outputs S [1] to S [2N], respectively.

Referring back to FIG. 4, during the vertical back porch period and the vertical front porch period of each vertical sync period (i.e., during the blanking or non-display update periods), only the source amplifiers $230_1$ and $230_{N+1}$ are activated while other source amplifiers 230 are deactivated (which is indicated by "OFF" in FIG. 4). In addition, all the switches 255 are closed (which is indicated by "ON" in FIG. 4). As a result, the output of the source amplifiers $230_1$ is electrically connected to the source outputs S [2] to S [N] and the output of the source amplifiers $230_{N+1}$ is electrically connected to the source outputs S [N+2] to S [2N], so that the source amplifiers $230_1$ and $230_{N+1}$ can provide the leakage suppression voltage to all of the source outputs S [1] to S [2N].

Figure 5B:
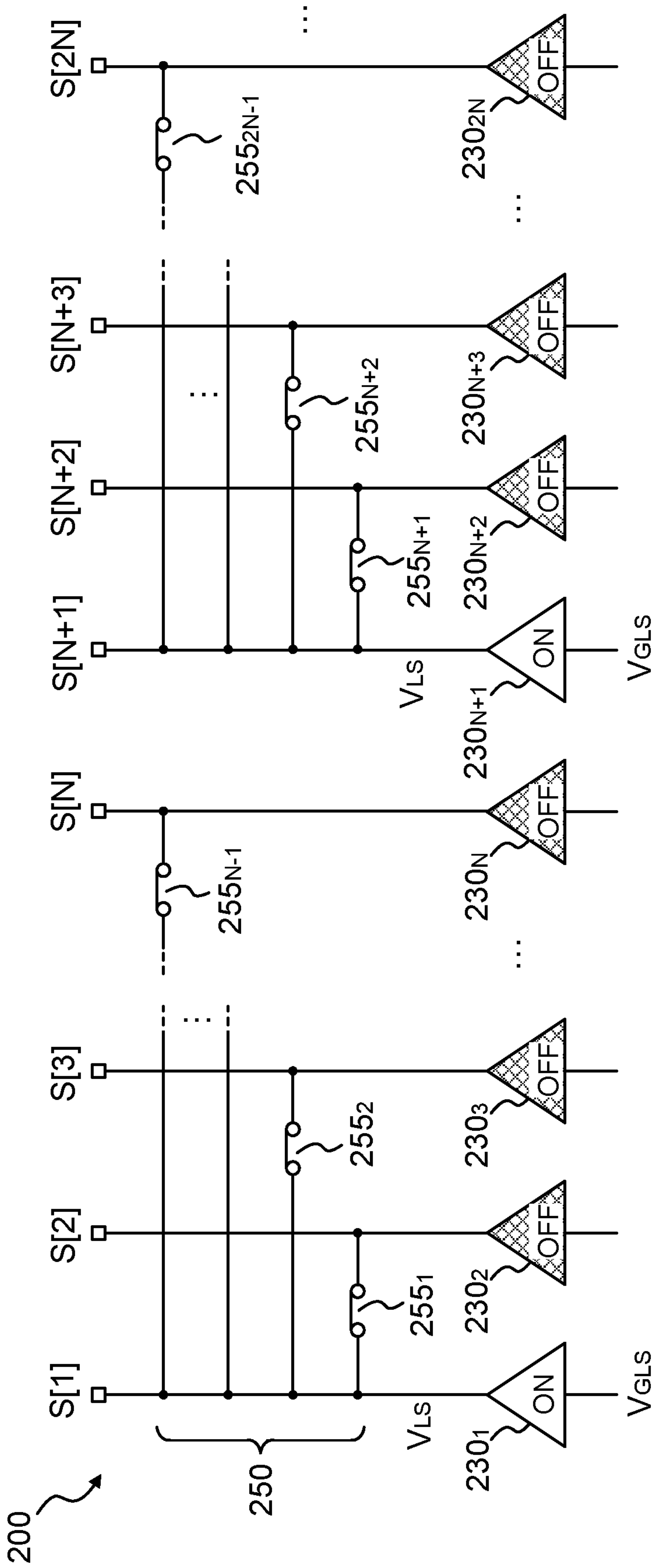
FIG. 5B shows an example operation of source amplifiers during a blanking period, according to one or more embodiments.

FIG. 5B shows an example operation of the source amplifiers $230_1$ to $230_{2N}$ during a blanking period (e.g., a vertical back porch period and a vertical front porch period) of each vertical sync period, according to one or more embodiments. The source amplifiers $230_1$ and $230_{N+1}$ receive a gamma voltage $V_{GLS}$ that corresponds to the leakage suppression greylevel $GL_{LS}$ from the DACs $220_1$ and $220_{N+1}$, respectively. More specifically, the latches $210_1$ and $210_{N+1}$ latch the leakage suppression greylevel $GL_{LS}$ from the register 260 in response to the assertion of the latch control signal CTRL (shown in FIG. 3) and provide the leakage suppression greylevel $GL_{LS}$ to the DACs $220_1$ and $220_{N+1}$. It is noted that other latches 210 may also latch the leakage suppression greylevel $GL_{LS}$, but the operation of the other latches 210 do not matter to generate the leakage suppression voltage. The DACs $220_1$ and $220_{N+1}$ provide the gamma voltage $V_{GLS}$ to the source amplifiers $230_1$ and $230_{N+1}$ based on the leakage suppression greylevel $GL_{LS}$ received from the latches $210_1$ and $210_{N+1}$.

The source amplifiers $230_1$ and $230_{N+1}$ generate the leakage suppression voltage, denoted by "$V_{LS}$" in FIG. 5B, from the gamma voltage $V_{GLS}$ received from the DACs $220_1$ and $220_{N+1}$, respectively. Since the output of the source amplifiers $230_1$ is electrically connected to the source outputs S [2] to S [N] and the output of the source amplifiers $230_{N+1}$ is electrically connected to the source outputs S [2] to S [N], the leakage suppression voltage is provided to all of the source outputs S [1] to S [2N] to drive the source lines SL [1] to SL [2N] to the leakage suppression voltage $V_{LS}$. This effectively suppresses or eliminates the charge leakage from the storage capacitors Cst of the pixels 110 coupled to the source lines SL [1] to SL [2N].

Further, the operation shown in FIGS. 4 and 5B allows the leakage suppression voltage to be provided to the source lines SL with reduced power consumption compared to the case where all of the source amplifiers are activated to provide the leakage suppression voltage to the source lines SL, because only one N-th of the source amplifiers are activated during blanking periods (e.g., vertical back porch periods and vertical front porch periods).

Figure 6A:
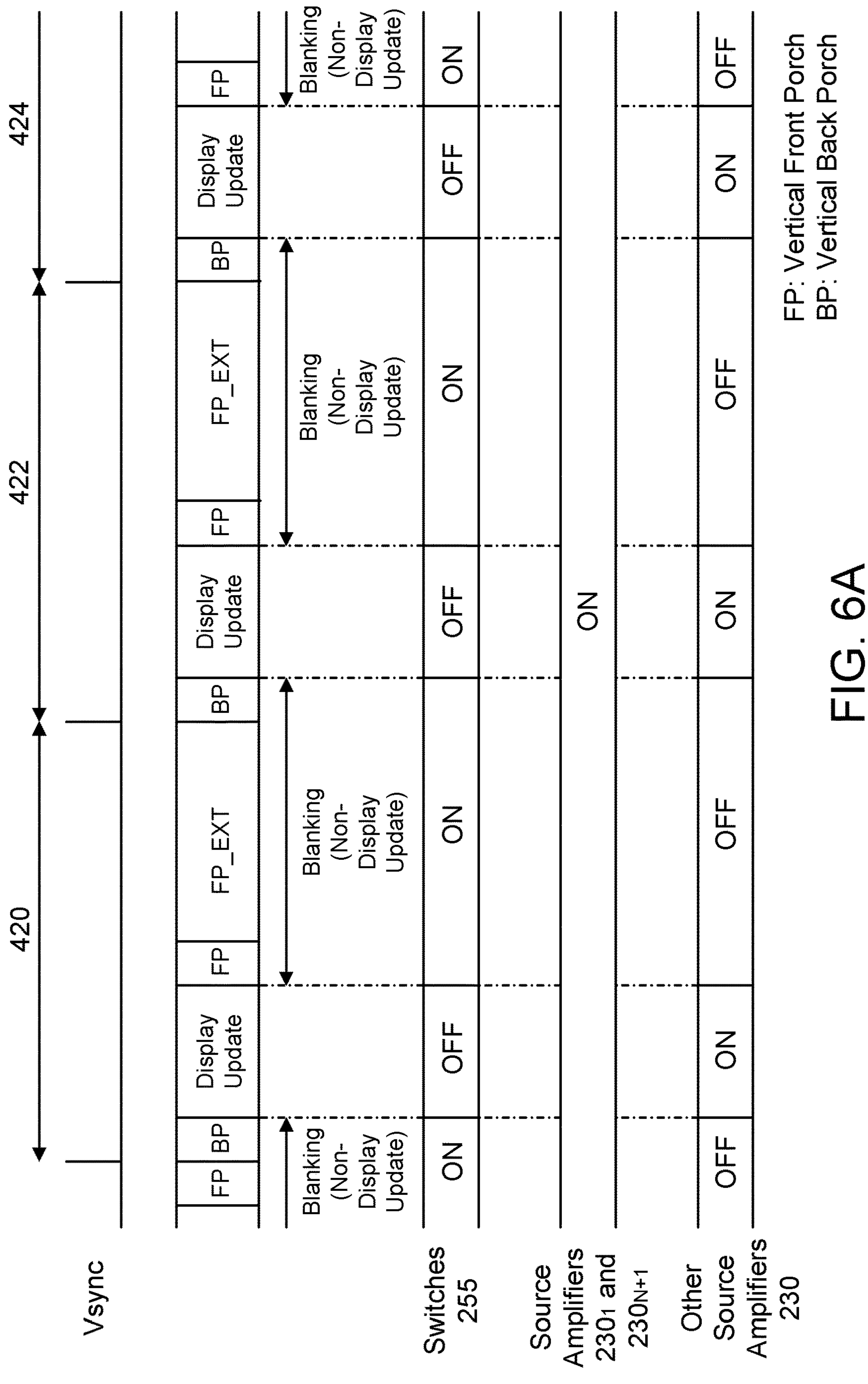
FIG. 6A is a timing chart showing another example operation of a display driver, according to one or more embodiments.

FIG. 6A is a timing chart showing another example operation of the part of the display driver 200 shown in FIG. 3 during vertical sync periods 420, 422, and 424, according to one or more embodiments. In the operation shown in FIG. 6A, each of the vertical sync period 420, 422, and 424 includes an extended vertical front porch period FP_EXT at the end thereof to reduce the frame rate as compared to the operation shown in FIG. 4. The extended vertical front porch period is a blanking or non-display update period that follows the vertical front porch period FP.

The operation shown in FIG. 6A is similar to that shown in FIG. 4, except that the leakage suppression voltage is also provided to the source outputs S [1] to S [2N] during the extended vertical front porch period of each vertical sync period in a manner similar to that provided during the vertical back porch period and the vertical front porch period. More specifically, during the extended vertical front porch period of each vertical sync period, the switches 255 are closed while the source amplifiers $230_1$ and $230_{N+1}$ are activated to provide the leakage suppression voltage to the source outputs S [1] to S [2N] with other source amplifiers 230 deactivated. Compared to the operation shown in FIG. 4, the operation shown in FIG. 6A provides a more significant effect of reducing the power consumption, because the blanking periods occupy a larger proportion of the total operation time.

Figure 6B:
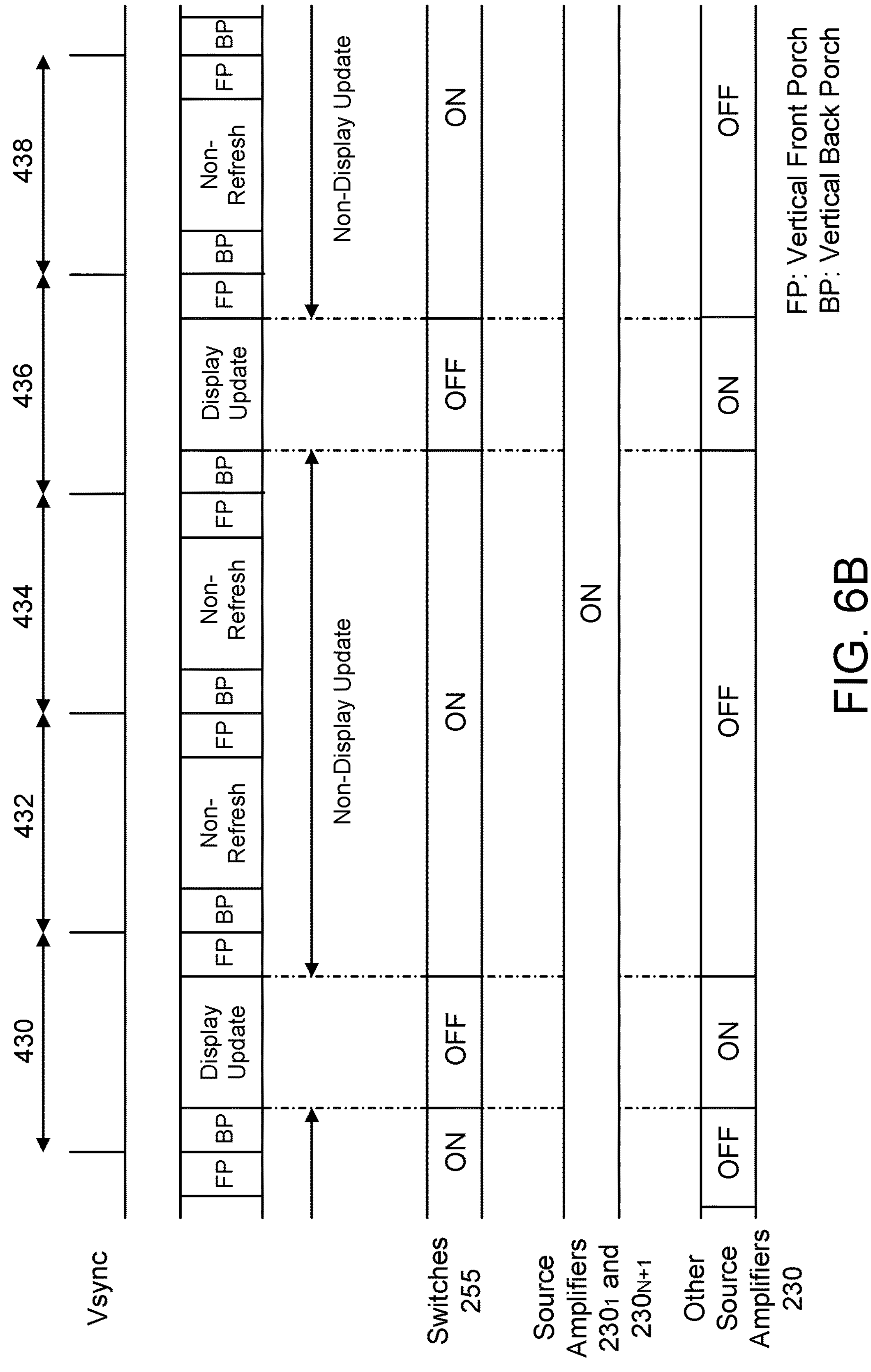
FIG. 6B is a timing chart showing yet another example operation of a display driver, according to one or more embodiments.

FIG. 6B is a timing chart showing yet another example operation of the part of the display driver 200 shown in FIG. 3 during vertical sync periods 430, 432, 434, 436, and 438, according to one or more embodiments. In the operation shown in FIG. 6B, the effective frame rate is reduced by providing vertical sync periods that include a non-refresh period instead of a display update period. More specifically, only some but not all of the vertical sync periods each include a display update period, while the remaining vertical sync periods each include a non-refresh period instead of a display update period. The non-refresh periods are non-display update periods during which no pixels 110 are updated.

The operation shown in FIG. 6B is similar to that shown in FIG. 4, except that the leakage suppression voltage is also provided to the source outputs S [1] to S [2N] during the non-refresh periods in a manner similar to that provided during the vertical back porch period and the vertical front porch period. More specifically, during the non-refresh periods, the switches 255 are closed while the source amplifiers $230_1$ and $230_{N+1}$ are activated to provide the leakage suppression voltage to the source outputs S [1] to S [2N] with other source amplifiers 230 deactivated. Compared to the operation shown in FIG. 4, the operation shown in FIG. 6B provides a more significant effect of reducing the power consumption, because the non-display update period, including the blanking periods and the non-refresh periods, occupy a larger proportion of the total operation time.

Figure 7:
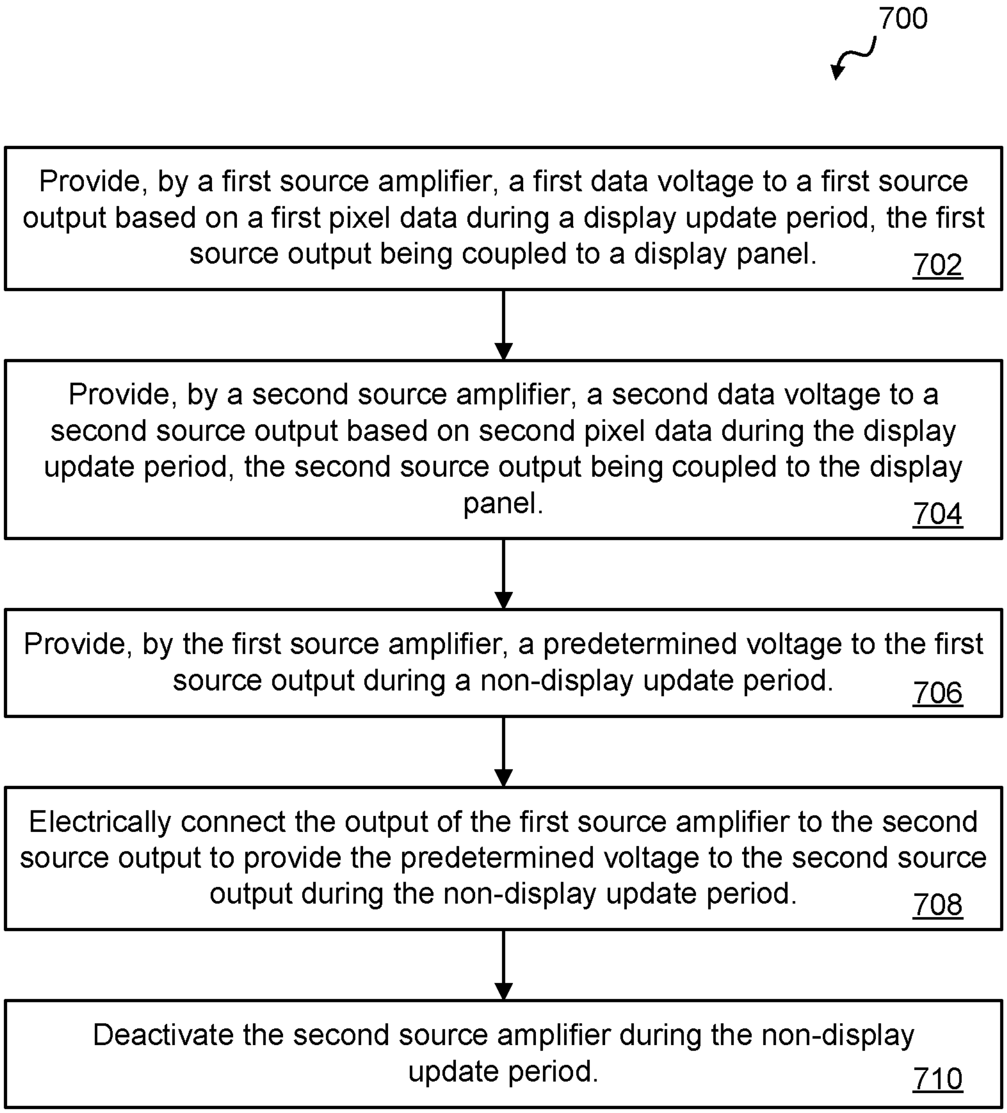
FIG. 7 is a flowchart of an exemplary process, according to one or more embodiments.

FIG. 7 is a flowchart of an exemplary process, according to one or more embodiments. The process 700 may be performed by the display device 1000 shown in FIG. 1, in particular by the display driver 200 shown in FIG. 3. However, it will be recognized that a display device that includes additional and/or fewer components as shown in FIG. 1 may be used to perform the process 700, that any of the following steps may be performed in any suitable order, and that the process 700 may be performed in any suitable environment.

At step 702, a first source amplifier (e.g., the source amplifiers $230_1$ and $230x$ shown in FIG. 3) provides a first data voltage to a first source output (e.g., the source outputs S [1] and S [N]) based on first pixel data (e.g., pixel data D [1] and D [N]) during a display update period. The first source output is coupled to a display panel (e.g., the display panel 100 shown in FIGS. 1 and 2). At step 704, a second source amplifier (e.g., other source amplifiers 230 shown in FIG. 3) provides a second data voltage to a second source output (e.g., the source outputs S other than the source outputs S [1] and S [N]) based on second pixel data (e.g., other pixel data than pixel data D [1] and D [N]) during the display update period. The second source output is coupled to the display panel. At step 706, the first source amplifier provides a predetermined voltage to the first source output during a non-display update period. The predetermined voltage may be a leakage suppression voltage used to suppress or eliminate charge leakage from storage capacitors in pixels of the display panel. At step 708, a switch circuitry (e.g., the switch circuitry 250) electrically connects the output of the first source amplifier to the second source output to provide the predetermined voltage to the second source output during the non-display update period. At step 710, the second source amplifier is deactivated during the non-display update period.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A display driver, comprising:
- a first source output coupled to a display panel;
- a second source output coupled to the display panel;
- a first source amplifier configured to:
  - provide a first data voltage to the first source output based on first pixel data during a display update period; and
  - provide a predetermined voltage to the first source output during a non-display update period, wherein the predetermined voltage corresponds to a voltage level which reduces charge leakage from storage capacitors of pixels of the display panel during the non-display update period, the pixels being coupled to the first and second source outputs;
- a second source amplifier configured to:
  - provide a second data voltage to the second source output based on second pixel data during the display update period; and
  - be deactivated during the non-display update period; and
- a first switch configured to electrically connect an output of the first source amplifier to the second source output to provide the predetermined voltage to the second source output during the non-display update period.

2. The display driver of claim 1, wherein the first switch is further configured to electrically disconnect the output of the first source amplifier from the second source output during the display update period.

3. The display driver of claim 1, further comprising:

a third source amplifier configured to;

provide a third data voltage to a third source output based on third pixel data during the display update period, the third source output being coupled to the display panel; and be deactivated during the non-display update period; and a second switch configured to electrically connect the output of the first source amplifier to the third source output during the non-display update period.

4. The display driver of claim 1, wherein the predetermined voltage is higher than a high-side power supply voltage provided to pixels of the display panel.

5. The display driver of claim 1, wherein the non-display update period comprises a blanking period.

6. The display driver of claim 1, wherein the non-display update period comprises a vertical back porch period and a vertical front porch period.

7. The display driver of claim 6, wherein the non-display update period further comprises a non-refresh period disposed between the vertical back porch period and the vertical front porch period.

8. The display driver of claim 1, further comprising:

a digital-to-analog converter (DAC) configured to:

provide a first gamma voltage to the first source amplifier based on the first pixel data during the display update period; and provide a predetermined gamma voltage to the first source amplifier during the non-display update period:

wherein the first source amplifier is further configured to:

generate the first data voltage based on the first gamma voltage; and generate the predetermined voltage based on the predetermined gamma voltage.

9. The display driver of claim 8, further comprising:

a register configured to store a greylevel;

wherein the DAC is further configured to receive the stored greylevel and generate the predetermined gamma voltage based on the stored greylevel.

10. A display device, comprising:

a display panel; and a display driver comprising:

a first source output coupled to the display panel;

a second source output coupled to the display panel;

a first source amplifier configured to:

provide a first data voltage to the first source output based on first pixel data during a display update period; and provide a predetermined voltage to the first source output during a non-display update period, wherein the predetermined voltage corresponds to a voltage level which reduces charge leakage from storage capacitors of pixels of the display panel during the non-display update period, the pixels being coupled to the first and second source outputs;

a second source amplifier configured to provide a second data voltage to the second source output based on second pixel data during the display update period; and a first switch configured to electrically connect an output of the first source amplifier to the second source output to provide the predetermined voltage to the second source output during the non-display update period;

wherein the display driver is configured to deactivate the second source amplifier during the non-display update period.

11. The display device of claim 10, wherein the first switch is further configured to electrically disconnect the output of the first source amplifier from the second source output during the display update period.

12. The display device of claim 10, further comprising:

a third source amplifier configured to provide a third data voltage to a third source output based on third pixel data during the display update period, the third source output being coupled to the display panel; and a second switch configured to electrically connect the output of the first source amplifier to the third source output during the non-display update period;

wherein the display driver is configured to deactivate the third source amplifier during the non-display update period.

13. The display device of claim 10, wherein the non-display update period comprises a blanking period.

14. The display device of claim 10, wherein the display driver further comprises a digital-to-analog converter (DAC) configured to:

provide a first gamma voltage to the first source amplifier based on the first pixel data during the display update period; and provide a predetermined gamma voltage to the first source amplifier during the non-display update period;

wherein the first source amplifier is further configured to:

generate the first data voltage based on the first gamma voltage; and generate the predetermined voltage based on the predetermined gamma voltage.

15. The display device of claim 14, wherein the display driver further comprises a register configured to store a greylevel;

wherein the DAC is further configured to receive the stored greylevel and generate the predetermined gamma voltage based on the stored greylevel.

16. A method, comprising:

during a display update period:

providing, by a first source amplifier, a first data voltage to a first source output based on first pixel data, the first source output being coupled to a display panel; and providing, by a second source amplifier, a second data voltage to a second source output based on second pixel data, the second source output being coupled to the display panel; and during a non-display update period:

electrically connecting an output of the first source amplifier to the second source output;

providing, by the first source amplifier, a predetermined voltage to both the first and second source outputs based on electrically connecting the output of the first source amplifier to the second source output, wherein the predetermined voltage corresponds to a voltage level which reduces charge leakage from storage capacitors of pixels of the display panel during the non-display update period, the pixels being coupled to the first and second source outputs; and deactivating the second source amplifier.

17. The method of claim 16, further comprising:

electrically disconnecting the output of the first source amplifier from the second source output during the display update period.

18. The method of claim 16, further comprising:

during the display update period:

providing, by a third source amplifier, a third data voltage to a third source output based on third pixel data, the third source output being coupled to the display panel; and during the non-display update period:

electrically connecting the output of the first source amplifier to the third source output; and deactivating the third source amplifier.

19. The method of claim 16, wherein the non-display update period comprises a blanking period.

20. The method of claim 16, wherein a digital-to-analog converter (DAC) provides a first gamma voltage to the first source amplifier based on the first pixel data during the display update period and provides a predetermined gamma voltage to the first source amplifier during the non-display update period; and wherein the first source amplifier generates the first data voltage based on the first gamma voltage and generates the predetermined voltage based on the predetermined gamma voltage.

* * * * *